April 29, 1969     W. H. PHILLIPS, JR     3,440,862
DRAW DIE ASSEMBLY

Filed Feb. 2, 1967

INVENTOR
William H. Phillips, JR.
BY John D. Mesaros
ATTORNEY

United States Patent Office 3,440,862
Patented Apr. 29, 1969

3,440,862
DRAW DIE ASSEMBLY
William H. Phillips, Jr., North Bergen, N.J., assignor to Carmet Company, Pittsburgh, Pa., a corporation of New Jersey
Filed Feb. 2, 1967, Ser. No. 613,599
Int. Cl. B21c 3/00
U.S. Cl. 72—467
9 Claims

ABSTRACT OF THE DISCLOSURE

A draw die assembly apparatus having a die insert for drawing high width to thickness ratio flat sections wherein a pressure bar assembly is inserted between the long legs of the die and an adjacent wall of a recess in the support plate. Each pressure bar assembly includes a scribed pressure bar having a pair of colinear slots, each slot having a pressure pad slidably secured thereto with the pressure pad having an enlarged portion of greater thickness. The enlarged portions are positioned, utilizing the scribe marks, so that they are generally aligned with the short legs of the die and means are provided to secure the die in the recess and apply compressive forces to the short legs via the pressure pads.

Background of the invention

In the drawing of flat sections having a high width to thickness ratio such as found in copper bus bar stock, commutation sections, and wide flat steel plate sections, problems have been encountered due to the types of dies normally used. The prior art die has generally been a round carbide insert shrunken into a steel support casing. Because of the uneven compressive force on the insert in this type of construction, the center portion of the wide flat bearing section of the insert will deflect more than at the ends of the section. This necessitates finishing the die after the insert is shrunk into the case. Furthermore, this requires a steel support casing for each carbide insert having a different configuration of the die opening.

It is therefore an object of this invention to provide a new and improved draw die assembly for drawing flat sections having a high width to thickness ratio.

It is another object of this invention to provide a new and improved draw die assembly which requires no shrink fitting of the die insert.

It is a further object of this invention to provide a new and improved draw die assembly which requires no machining of the die after assembly.

It is still another object of this invention to provide a new and improved draw die assembly in which the draw dies can be readily interchanged in a single support casing.

It is a still further object of this invention to provide a new and improved draw die assembly which applies localized compressive forces to the die insert to prevent deflection or breakage of the draw die during drawing operations.

Summary of the invention

The foregoing objects are accomplished by providing a rectangular die which is mechanically secured to the casing. Compressive forces are applied to the short legs at the ends of the die opening to preload the carbide insert die to its maximum. Means are also provided to support the center section of the die insert to prevent deflection in the opposite direction during the drawing operation. The means for applying the compressive forces are made adjustable so that the same means can be utilized for various draw dies having different shapes of openings.

Brief description of the drawings

These and other objects together with a fuller understanding of the invention will become apparent from the following description when taken in conjunction with the accompanying drawings in which.

Description of the preferred embodiment

Figure 1:
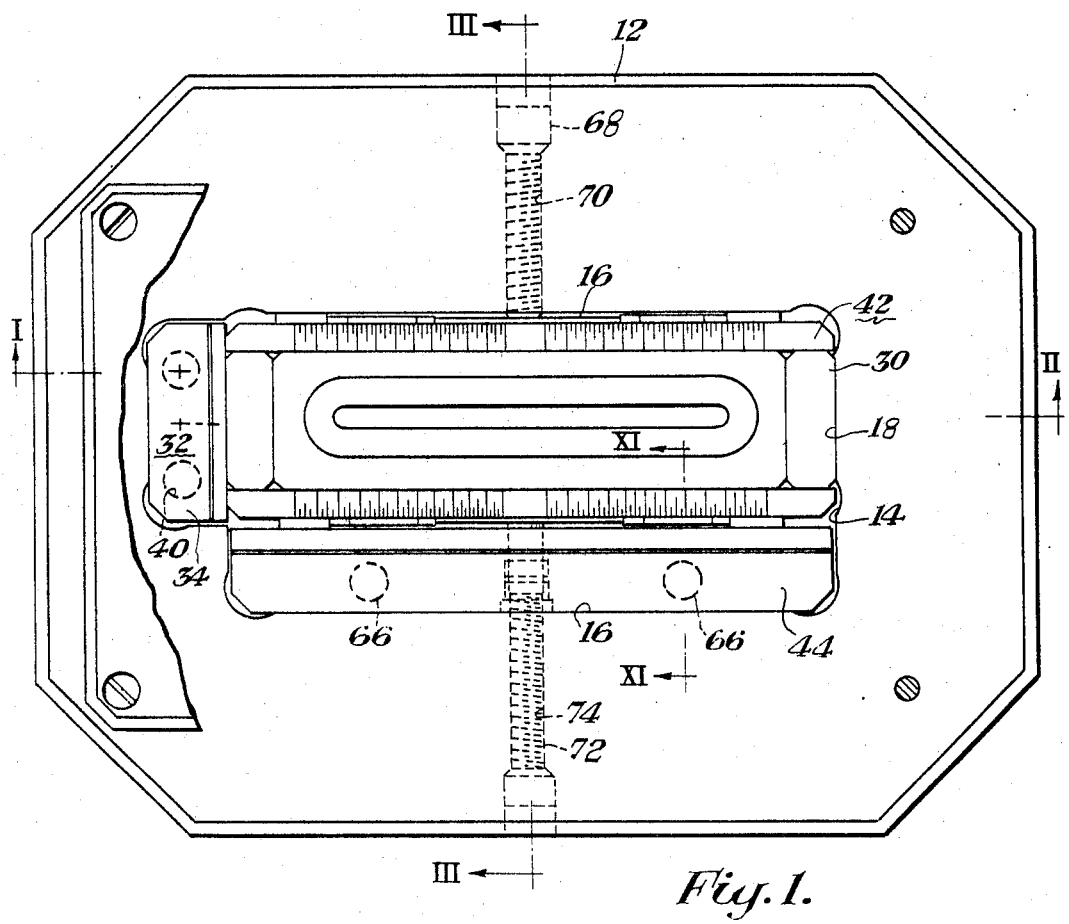
FIGURE 1 is a front elevational view of a draw die assembly according to the invention with the cover partially cut away.
Figure 2:
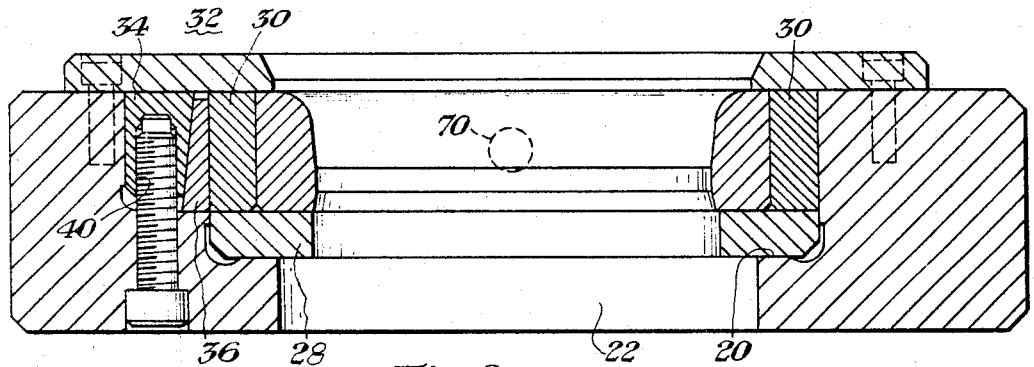
FIG. 2 is a sectional view taken substantially along the plane designated by the line II—II of FIG. 1.
Figure 3:
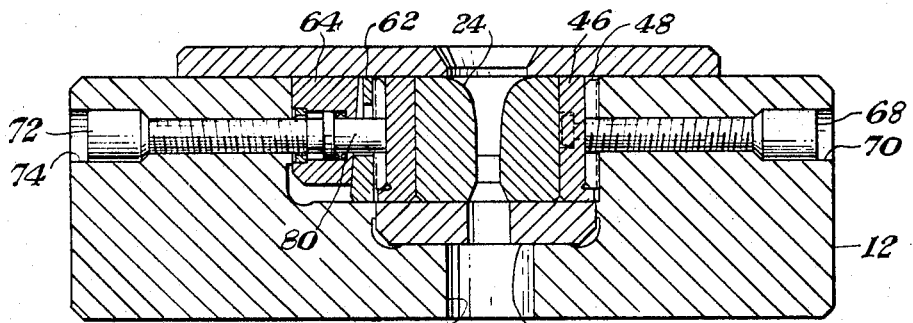
FIG. 3 is a sectional view taken substantially along the plane designated by the line III—III of FIG. 1 and rotated 90°.

Referring now to the drawings, and particularly to FIGS. 1 and 2, there is shown a steel support casing 12 having a recess 14 therein, the recess 14 having side walls 16 and end walls 18 defining a polygonal configuration for the recess 14. The recess 14 also has a base portion 20 having an aperture 22 therein, which aperture is at least the size of the opening of the die to be inserted therein. As shown in FIG. 2, in order to provide for the interchangeability of insert dies, the aperture 22 is made at least as large as the largest insert die expected to be used with the support casing 12. A bottom filler block 28 is positioned in the recess adjacent the aperture 22, the filler block 28 having an aperture therein which closely approximates the size of the die opening of the die to be used therewith. The die 24 is inserted into the recess 14 with its base abutting against the bottom filler block 28. Aperture 26 in the die 24 is aligned with the aperture in the filler block 28. Interposed between one end of the die 24 and the wall 18 of the recess 14 is an end filler block 30 with a second end filler block 30 and an additional wedge assembly 32 provided at the other end. The end wedge assembly 32 comprises a pair of slidable mating wedges 34 and 36 having the inclined portions thereof cooperating to apply pressure to one end of filler block 30 to restrain the die 24 in its longitudinal dimension. The wedges 34 and 36 are disposed between one end of filler block 30 and the adjacent end wall 18 of recess 14. A cap screw 38 is inserted through an aperture in the support casing 12 into recess 14 to engage a threaded aperture 40 in the wedge 34. As the cap screw 38 is tightened, the wedge 34 is drawn toward the base portion 20 of recess 14 to urge wedge 36 tightly against filler block 30 thereby securing the die 24 from longitudinal movement.

Interposed between the longer sides of the die 24 and the side walls 16 of recess 14 is one or more pressure pad assemblies generally designated 42 and one or more side filler blocks 44. The pressure pad assembly 42 includes a pressure bar 46 (see FIGS. 5–10) and a pair of pressure pads 48 slidably secured thereto. The pressure bar 46 is L-shaped in cross-section with a slight projection 50 at its base to restrain rotation of the pressure pads 48 during assembly. A pair of elongated colinear slots 52 are generally centrally located on the pressure bar 46 with a milled portion 54 encircling the slot to permit recessed insertion of a cap screw 56 which threadably engages an aperture 58 in each pressure pad 48.

Figure 6:
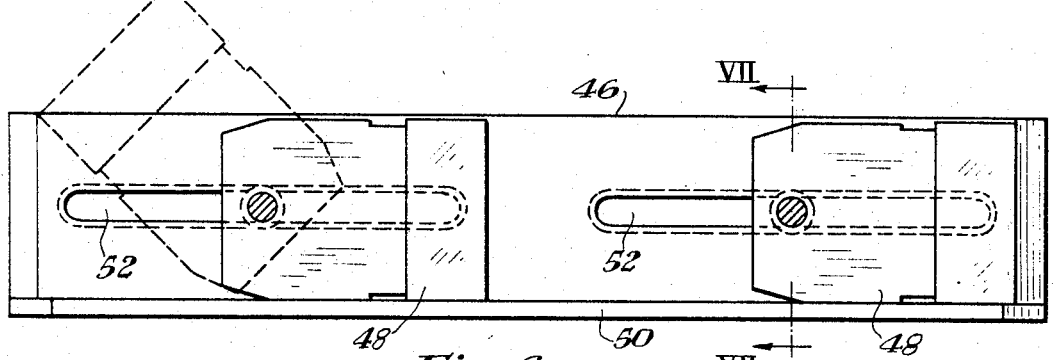
FIG. 6 is a side elevational view of the pressure pad assembly of FIG. 5.
Figures 7, 8:
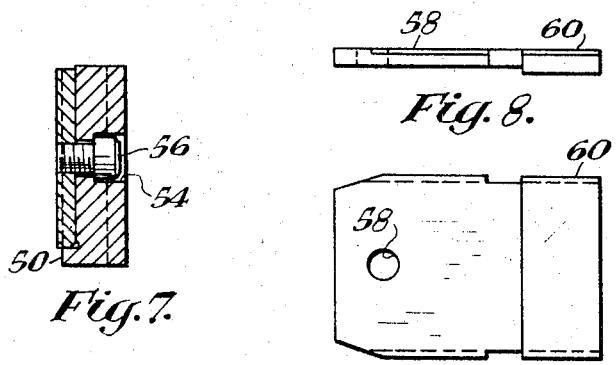
FIG. 7 is a sectional view taken substantially along the plane designated by the line VII—VII of FIG. 6.
FIG. 8 is a front elevational view of the pressure pad according to the invention.
Figures 9, 10:
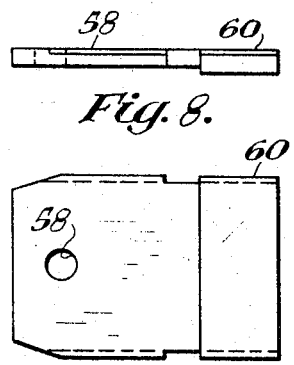
FIG. 9 is a side elevational view of the pressure pad of FIG. 8.
FIG. 10 is an end view of the pressure pad of FIG. 8.

Each pressure pad 48 is generally rectangular in form with the aperture 58 located generally centrally adjacent one end thereof while the other end has an enlarged rectangular portion 60 which is thicker than the balance of the pad. The pressure pad 48 is beveled at the corners adjacent the aperture 58 which is used as an axis of rotation to permit varying the position of the pad 48 on the pressure bar 46. The pressure bar 46, as shown in FIGS. 1 and 6, is scribed and numerals applied thereto. The scribe marks assist in the placement of the pressure pads 48 when used with any one of different dies 24, as will be discussed later.

During the assembly of the draw die assembly, the draw die 24 is selected along with a corresponding bottom filler plate 28 and inserted in the recess 14 of the support plate 12. With a rectangular die, excessive forces are created during the drawing operation, these forces generally being concentrated at the corners of the die opening 26. If these forces are not counteracted, the draw die 24 will fracture along lines generally extending from the corners of the die opening 26 at the outer corners of the draw die 24. In order to offset these forces, compressive forces are applied to the short legs of the draw die 24 by utilization of the pressure pad assembly 42. As hereinbefore mentioned, the pressure bar 46 has scribe marks thereon to facilitate placement of the enlarged rectangular portions 60 of the pressure pads 48. As shown in FIG. 1, the enlarged rectangular portions 60 of the pressure pads 48 are located generally centrally with respect to the short legs of the draw die 24. Each pair of opposing pressure pads 48 cooperating with its adjacent short leg must be fairly accurately placed to insure that the lines of compressive force emanating from each enlarged portion 60 are concentrated within the same area to prevent bending forces within the leg itself which may tend to fracture the draw die 24 during the drawing operation. Accordingly, the scribe marks provide a means for accurately positioning opposite pressure pads 48.

After the pressure pads 48 are suitably positioned on the pressure bars 46, the pressure bar assemblies 42 are positioned in a butting relationship with the long legs of the draw dies 24. The pressure pad assemblies are disposed with the pressure bars 46 abutting the long legs of the draw die 24.

Figure 11:
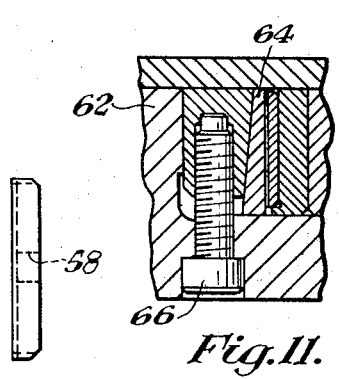
FIG. 11 is a partial sectional view taken substantially along the plane designated by the line XI—XI of FIG. 1.

As shown in FIG. 1, the upper pressure bar assembly 42 is disposed between one long leg of the draw die 24 and the side wall 16 of the support plate 12, and the other pressure bar assembly 42 is disposed between the other long leg of the draw die 24 and a side wedge assembly 44. The wedge assembly 44 (see FIG. 11) includes a pair of mating wedges 62 and 64 having inclined portions slidable with respect to each other to apply pressure to the transverse dimension of the draw die 24 as the wedge 62 is drawn downwardly toward the base portion 20 of the support plate 12 by means of a cap screw 66 which is inserted through an aperture in the support plate 12 and into a threaded aperture in the wedge 62 of the wedge assembly 44. As shown in FIG. 1, two such cap screws 66 are provided for the wedge assembly 44 on opposite sides of the center line thereof.

Figure 12:
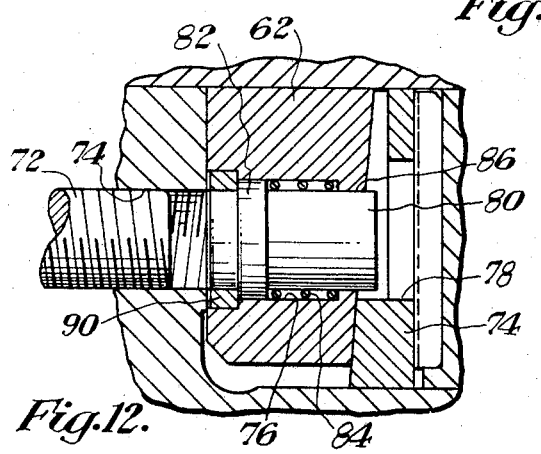
FIG. 12 is an exploded sectional view showing the wedge means for the side wall of the die with the stud in its retracted position.
Figure 13:
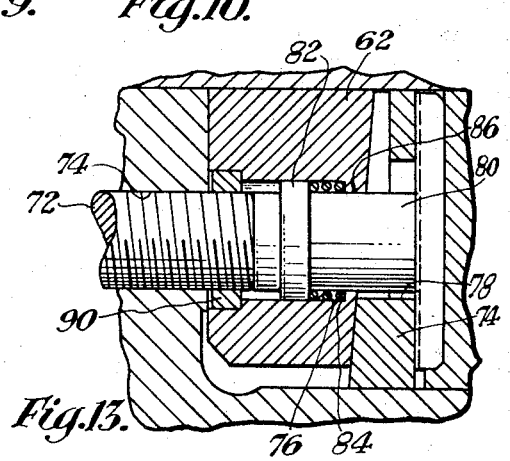
FIG. 13 is a view of FIG. 12 with the stud in its extended position.

Due to the location of the pressure pads 48, it can be seen that there is a space between pressure bar 46 and the side wall 16 of recess 14 adjacent one long leg of the draw die 24 and a space between the pressure bar 46 and the wedge assembly 44 adjacent the other long leg of the draw die 24. Without providing support of some kind, it is apparent that the centers of the long legs of the draw die 24 would tend to deflect during the drawing operation. This is overcome by providing a cap screw 68 which is inserted through an aperture in the support plate 12 through the side wall 16. The aperture 70 is threaded and the cap screw 68 is tightened to bear against the pressure bar 46 to provide support for the center of the one long leg of the draw die 24. Similarly, a second screw 72 extends through a second threaded aperture 74 through side wall 16 of recess 14 adjacent the wedge assembly 44. The wedge assembly 44 (see FIGS. 12 and 13) contains an aperture 76 in the wedge 62, and an aligned aperture 78 in the wedge 64. Inserted in the aperture 76 of wedge 62 is a stud 80 having shoulder means 82, the stud 80 being movable within the aperture 76. Spring means 84 are interposed between the shoulder means 82 of stud 80 and shoulder means 86 of recess 76 to urge the stud 80 outwarly from the adjacent wedge 64. A restraining ring 90 is inserted into the aperture 76 at the end opposite shoulder means 86 to cooperate with the shoulder means 82 of stud 80 and thereby prevent removal of the stud 80. As shown in FIGS. 12 and 13, the stud 80 is operable between a retracted position (FIG. 12) and an extended position (FIG. 13) by movement of the cap screw 72. As the cap screw 72 is tightened, the stud 80 is moved against the force of the spring means 84 to extend through aperture 78 of wedge 64 to bear against the pressure bar 42. As can be seen in FIG. 1, the cap screws 72 and 68 are generally in line and centrally located with respect to the location of the draw die 24, thereby providing support for the long legs of the draw die 24 to prevent deflection thereof during the drawing operation.

Figure 4:
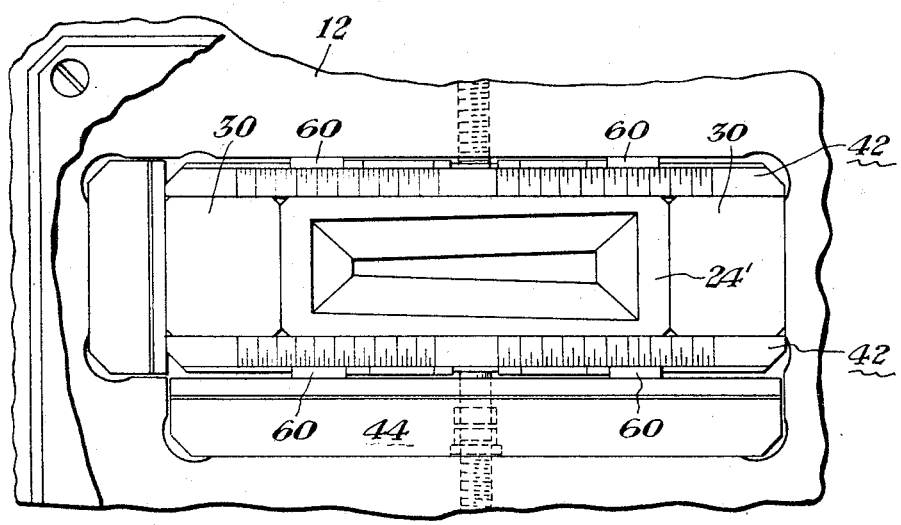
FIG. 4 is a partial front elevational view of a draw die assembly employing a die with a trapezoidal opening.
Figure 5:
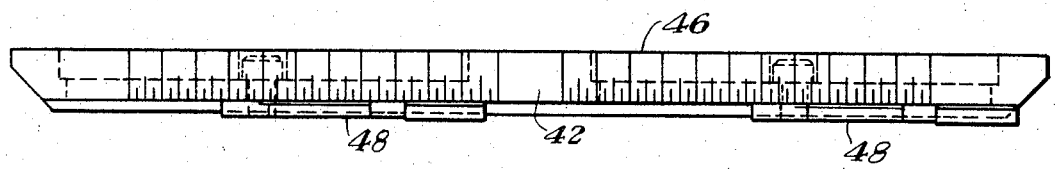
FIG. 5 is a front elevational view of the pressure pad assembly according to the invention.

A trapezoidal die 24' is shown in FIG. 4 with the enlarged portions 60 of the pressure pads 48 in opposing relationship and located generally centrally with respect to the short legs of the draw die 24'.

Thus it can be readily appreciated that the pressure pad assembly 42 can be utilized with draw dies having a rectangular configuration, irrespective of the general configuration of the draw die opening, the only requirements being that the compressive forces established by the pressure pads 48 to be located in such a manner to prevent fracture adjacent the corners of the draw die opening and, further, that the centers of the long legs of the draw die be suitably supported as described.

It is to be understood that although the invention has been shown in connection with said specific embodiments, it will be readily apparent to those skilled in the art that various changes in form and arrangement of parts may be made to suit requirements without departing from the spirit and scope of the invention.

I claim:

1. In a draw die assembly for drawing flat sections having a high width to thickness ratio, the combination comprising:
   (a) a support casing having a recess therein, said recess have a base portion with an aperture therein having wall portions defining a polygonal configuration;
   (b) a generally rectangular die having a pair of short legs interconnected by a pair of long legs defining an elongate die opening therein, said die being positioned in said recess with the die opening being aligned with said aperture, said aperture being at least the size of said die opening;
   (c) first means cooperating with the wall portions of said recess for applying compressive forces to the short legs of said die;
   (d) second means cooperating with the long legs of said die for preventing deflection of said long legs during the drawing operation; and
   (e) other means cooperating with said first means for securing said die within said recess.

2. The combination of claim 1 wherein said first means includes a pair of pressure pads interposed between one long leg of said die and the adjacent wall portion of said recess, each of said pressure pads being generally aligned with a short leg of said die.

3. The combination of claim 2 wherein each pressure pad is connected adjacent opposite ends of an elongate pressure bar to form a pressure pad assembly, the pressure bar abutting against the long leg of said die.

4. The combination of claim 2 wherein said second means includes screw means positioned generally centrally of the long legs of said die.

5. The combination of claim 3 wherein the pressure pads are slidably connected to the pressure bar and the pressure bar is scribed to preset the positions of the pressure pads according to the die dimensions.

6. The combination of claim 2 wherein a second pair of pressure pads is interposed between the other leg of said die and the adjacent wall portion of said recess, each of said second pair of pressure pads being generally aligned with a short leg of said die.

7. The combination of claim 1 wherein said other means includes wedge means and filler blocks positioned within the recess for applying restraining forces to the long legs of said die.

8. The combination of claim 3 wherein a second pressure pad assembly is interposed between the other long leg of said die and the adjacent wall portion of said recess with its pressure bar abutting against the long leg of said die.

9. In a draw die assembly for drawing flat sections having a high width to thickness ratio, the combination comprising:
(a) a support casing having a recess therein, said recess having a base portion with an aperture therein and having wall portions defining a polygonal configuration;
(b) a generally rectangular die having a pair of short legs interconnected by a pair of long legs defining an elongate die opening therein, said die being positioned in said recess with the die opening being aligned with said aperture, said aperture being at least the size of said die opening;
(c) a first pair of pressure pads being interposed between one long leg of said die and the adjacent wall portion of said recess, each of said pressure pads having the same thickness and being generally aligned with a short leg of said die;
(d) a second pair of pressure pads being interposed between the other long leg of said die and the adjacent wall portion of said recess, each of said second pair of pressure pads being generally aligned with each of said first pair of pressure pads;
(e) wedge means interposed between said second pair of pressure pads and the adjacent wall portion of said recess, said wedge means including a first and a second wedge-shaped member with the inclined portions thereof being slidably mating, screw means inserted through the base portion of said recess and engaging one member of said wedge means, said screw means being tightened for applying compressive forces to the short legs of said dies;
(f) other screw means including a first screw inserted through an aperture in said support casing for abutting one long leg of said die generally centrally thereof and a second screw inserted through an aperture in said casing and an aperture in said wedge means for abutting against the other long leg of said die, said other screw means preventing deflection of said long legs during the drawing operation; and
(g) other wedge means cooperating with at least one of said short legs and the adjacent wall portion of said recess for securing said die within said recess.

References Cited
UNITED STATES PATENTS 423,334    3/1890    Moltrup et al. _____ 72—468
627,557    6/1899    White _____ 72—467

MILTON S. MEHR, *Primary Examiner.*